J. J. SCHOCK.
Method of Cleaning Type.

No. 211,865. Patented Feb. 4, 1879.

Witnesses:
F. B. Townsend
Julia Hawley

Inventor:
James J. Schock
per Munday & Evarts
Attorneys

UNITED STATES PATENT OFFICE.

JAMES J. SCHOCK, OF CHICAGO, ILL., ASSIGNOR OF ONE-HALF HIS RIGHT TO ANSEL N. KELLOGG AND EDWIN E. PRATT, OF SAME PLACE.

IMPROVEMENT IN METHODS OF CLEANING TYPE.

Specification forming part of Letters Patent No. 211,865, dated February 4, 1879; application filed October 15, 1878.

*To all whom it may concern:*

Be it known that I, JAMES J. SCHOCK, of Chicago, in the county of Cook and State of Illinois, have invented certain Improvements in Method of Cleaning Printing-Type, of which the following is a specification:

My improvement consists in subjecting the type, as they come from the press, to the action of live steam for cleaning and loosening them.

It further consists in subjecting them to the action of steam while they are immersed in a lye or other bath.

It further consists in subjecting the type to the action of rising steam by admitting or giving the steam access to the under surface of the type.

It further consists in the apparatus used to accomplish the result, the details whereof will appear from the subjoined description and the accompanying drawings, in which drawings—

Figure 1:
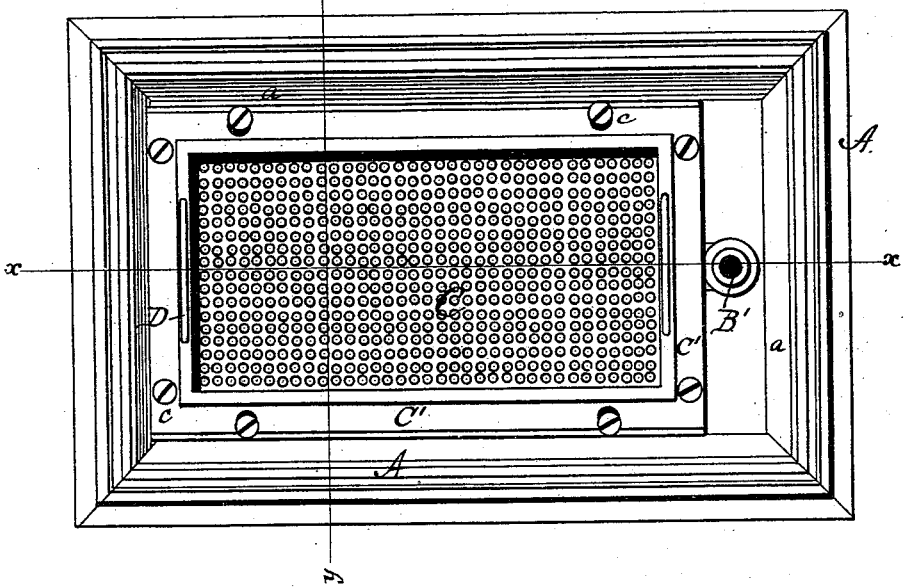
Figure 2:
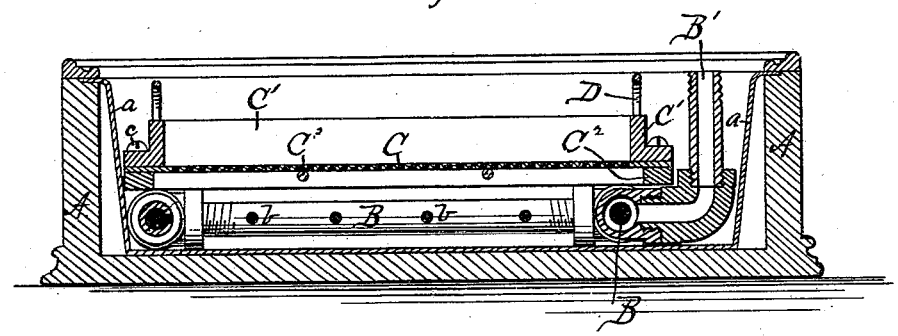
Figure 3:
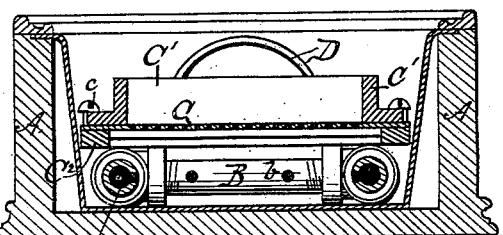

Figure 1 is a plan view; Fig. 2, a vertical section on the line $x\ x$ of Fig. 1; and Fig. 3, a cross vertical section on the line $y\ y$ of Fig. 1.

In said drawings, A represents a rectangular sink or vat lined with suitable material $a$, so as to be tight and hold water. In this vessel is placed a coil of steam-pipe, B, to which steam is admitted through a connecting-pipe, B'. The interior of the coil is perforated, as at $b$, whereby the steam is permitted to escape into the bath.

The type are placed upon a removable tray provided with a perforated or open-work bottom, C, formed by punching numerous small holes in a sheet of metal. This bottom is held in a rigid frame-work composed of ledge-pieces $C^1$, somewhat less than type-high, and under pieces, $C^2$, between which the edges of the bottom are firmly clamped by screws or rivets $c$. Other bars, $C^3$, for supporting the bottom are added when necessary. Handles D, of which there are one or more at each end, are attached to the tray, so it may be conveniently lifted in or out of the bath. When in the bath, the tray may rest upon the steam-coil, or, if preferred, upon supports specially provided therefor.

The operation is substantially as follows:

The type, after they are taken from the press, are placed in the tray, being unlocked either before or immediately thereafter, and the tray and type are then put in the sink, to which water is then or previously admitted in sufficient quantity to cover the type-surfaces. The usual lye preparation is applied to the type before immersion, or it may be mixed with the water of the bath. The steam being turned on, a violent agitation of the water is caused, and the steam itself rises to the under surface of the type through the openings in the tray-bottom. It is thus permitted and made to work its way upward through the type, and to loosen and cleanse the same by freeing or dissolving the refuse matter adhering thereto. The tray affords a lodgment for the loosened refuse which is not taken up by the water. During the bathing it will be found useful to pass a brush over the faces and loosen the type slightly in that way. When the process is completed the tray may be lifted out and the type distributed directly from it.

It will be noticed that the perforations in the coil direct the steam into the open space directly under the tray, and that the tray and coil are relatively so constructed that this result is insured. Of course, they need not be correspondingly shaped; but it is important, and adds to the beneficial operation of the apparatus, that the steam be given exit, so that it will rise to the under surfaces of the type through the tray-bottom.

I have demonstrated, by actual use, that the type may be thoroughly cleaned and freed from each other in the way described, thus doing away with all necessity for dislodging the type by striking bodies of it cornerwise upon some solid substance in the ordinary way, which striking ends sooner or later, in "upsetting" the type, as it is called; and this feature of the invention adds very greatly to the life of the type. The type, also, by reason of their greater cleanliness, give much better and sharper impressions than when cleaned in the old way.

It will be understood that many of the details of the process enumerated may be varied, and some of them may be omitted altogether. The open-work tray may be used, it is believed, without the steam, and the steam without the tray, to some advantage over old methods.

To prevent "pieing" of the outlying type, loose pieces of metal may be laid against them to support them while in the tray. The raised ledges, of course, assist in this respect. The coil serves also to heat the bath to the boiling-point, and in case it should be desired to use the process without giving exit to the steam, a coil without openings, or equivalent means, may be employed for heating. By bringing the bath to boiling-heat, results not so effectual but similar to those specified may be attained without using the free steam.

I claim—

1. The apparatus for cleaning type, consisting of the following instrumentalities, to wit: the sink provided with a perforated steam-coil at the bottom, and the independent removable "galley," having vertical edges for supporting the type in an upright position, and an open-work bottom to give the steam access to the feet of the type, as set forth.

2. The described process of cleaning type, which consists in immersing them in the bath and admitting the steam to their under surfaces, substantially as set forth.

JAMES J. SCHOCK.

Witnesses:
E. E. PRATT,
EDW. S. EVARTS.